(12) United States Patent
Hartmann

(10) Patent No.: US 9,657,878 B2
(45) Date of Patent: May 23, 2017

(54) PLUG CONNECTION FOR CONNECTING LINES FOR PRESSURIZED LIQUIDS OR GASES

(71) Applicant: Henn GmbH & Co KG., Dornbirn (AT)

(72) Inventor: Harald Hartmann, Dornbirn (AT)

(73) Assignee: Henn GmbH & Co KG., Dornbirn (AT)

( * ) Notice: Subject to any disclaimer, the term of this patent is extended or adjusted under 35 U.S.C. 154(b) by 201 days.

(21) Appl. No.: 14/385,523

(22) PCT Filed: May 6, 2013

(86) PCT No.: PCT/AT2013/050101
§ 371 (c)(1),
(2) Date: Sep. 16, 2014

(87) PCT Pub. No.: WO2013/166536
PCT Pub. Date: Nov. 14, 2013

(65) Prior Publication Data
US 2015/0101173 A1 Apr. 16, 2015

(30) Foreign Application Priority Data

May 7, 2012 (AT) .................................. A 537/2012

(51) Int. Cl.
*F16L 37/088* (2006.01)
(52) U.S. Cl.
CPC ....... *F16L 37/088* (2013.01); *Y10T 29/49947* (2015.01)
(58) Field of Classification Search
CPC ............................. F16L 37/0841; F16L 37/088
(Continued)

(56) References Cited

U.S. PATENT DOCUMENTS 3,428,340 A * 2/1969 Pelton .................. F16L 37/088
285/321
4,991,880 A * 2/1991 Bernart ................ F16L 37/088
285/305
(Continued)

FOREIGN PATENT DOCUMENTS

AT DE 202012102801 U1 * 8/2012 ............ F16L 37/088
CN 1878982 A 12/2006
(Continued)

OTHER PUBLICATIONS

International Search Report of PCT/AT2013/050101, mailed Oct. 17, 2013.
(Continued)

*Primary Examiner* — David E Bochna
(74) *Attorney, Agent, or Firm* — Collard & Roe, P.C.

(57) ABSTRACT

A plug connection includes a first plug connector, a second plug connector which can be inserted in the first plug connector, and a detent spring fastened to the first plug connector. The detent spring engages in a groove of the second plug connector when a second plug connector is inserted. The detent spring can be moved from a locked position into an unlocked position. In the locked position the detent spring is prevented from effecting a movement radially outwards into an unlocked position. In the unlocked position the movement of the detent spring radially outwards is unblocked. A release device which can be selectively activated is provided on the first plug connector. The activated release device holds the detent spring in the unlocked position.

12 Claims, 9 Drawing Sheets

(58) Field of Classification Search
USPC .................. 285/305, 308, 314, 315, 316
See application file for complete search history.

(56) References Cited

U.S. PATENT DOCUMENTS

| | | | | |
|---|---|---|---|---|
| 5,341,773 | A | * | 8/1994 | Schulte .................. F02D 9/105 |
| | | | | 285/305 |
| 7,597,362 | B2 | | 10/2009 | Hartmann |
| 2004/0183301 | A1 | * | 9/2004 | Yoshida ................ F16L 37/088 |
| | | | | 285/305 |
| 2007/0236013 | A1 | | 10/2007 | Hartmann |
| 2008/0191471 | A1 | | 8/2008 | Hartmann |
| 2012/0056420 | A1 | * | 3/2012 | Fansler ................ F16L 37/088 |
| | | | | 285/308 |
| 2013/0009393 | A1 | | 1/2013 | Hartmann et al. |

FOREIGN PATENT DOCUMENTS

| | | | |
|---|---|---|---|
| CN | 1950636 A | 4/2007 | |
| CN | 101300445 A | 11/2008 | |
| DE | 100 17 679 C1 | 9/2001 | |
| DE | EP 1724510 A2 * | 11/2006 | ............ F16L 37/088 |
| DE | 10 2008 027 204 A1 | 12/2009 | |
| DE | 102008046143 A1 * | 3/2010 | ............ F16L 37/088 |
| EP | 1 705 417 A2 | 9/2006 | |
| JP | S62-194281 U | 12/1987 | |
| JP | H03-002991 U | 1/1991 | |
| JP | H08-219352 A | 8/1996 | |
| JP | 2004211891 A | 7/2004 | |
| JP | 2006-266472 A | 10/2006 | |
| JP | 2006-266474 A | 10/2006 | |
| JP | WO 2015141557 A1 * | 9/2015 | ............ F16L 37/088 |
| SE | DE 102005028558 B3 * | 1/2007 | ............ F16L 13/141 |
| WO | 2011/106805 A1 | 9/2011 | |
| WO | 2011/140281 A2 | 11/2011 | |

OTHER PUBLICATIONS

English translation of Japanese Office Action dated Jan. 10, 2017.

* cited by examiner

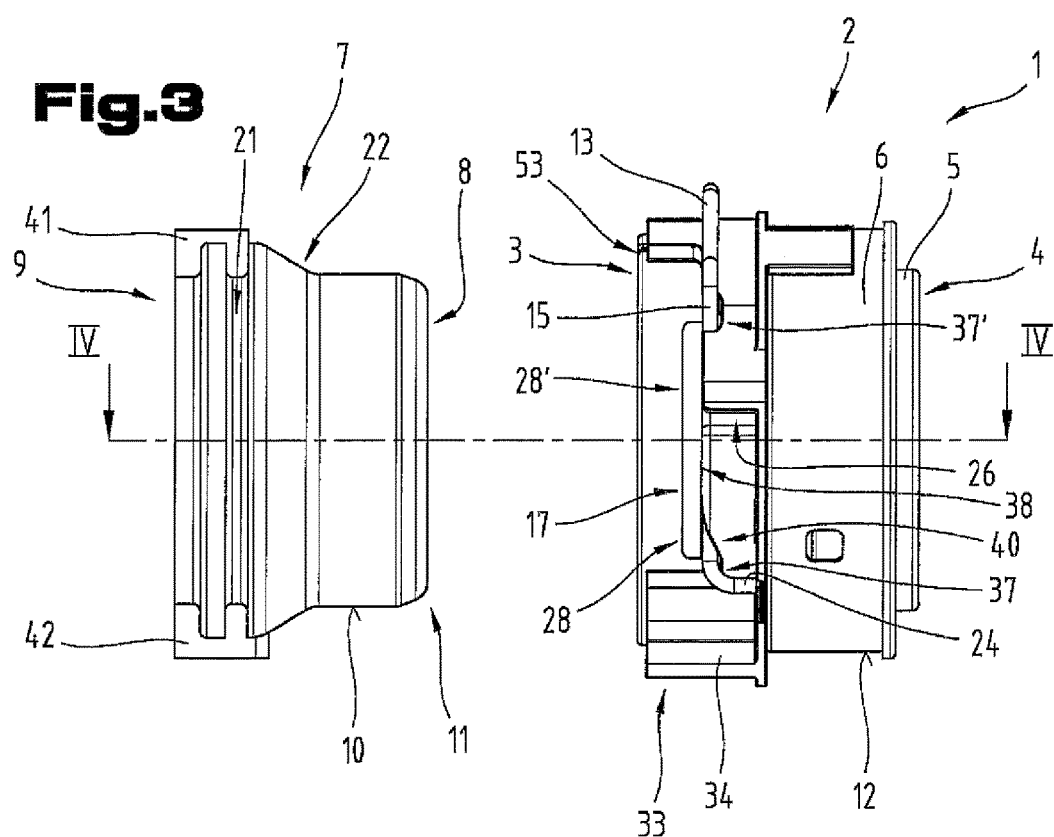

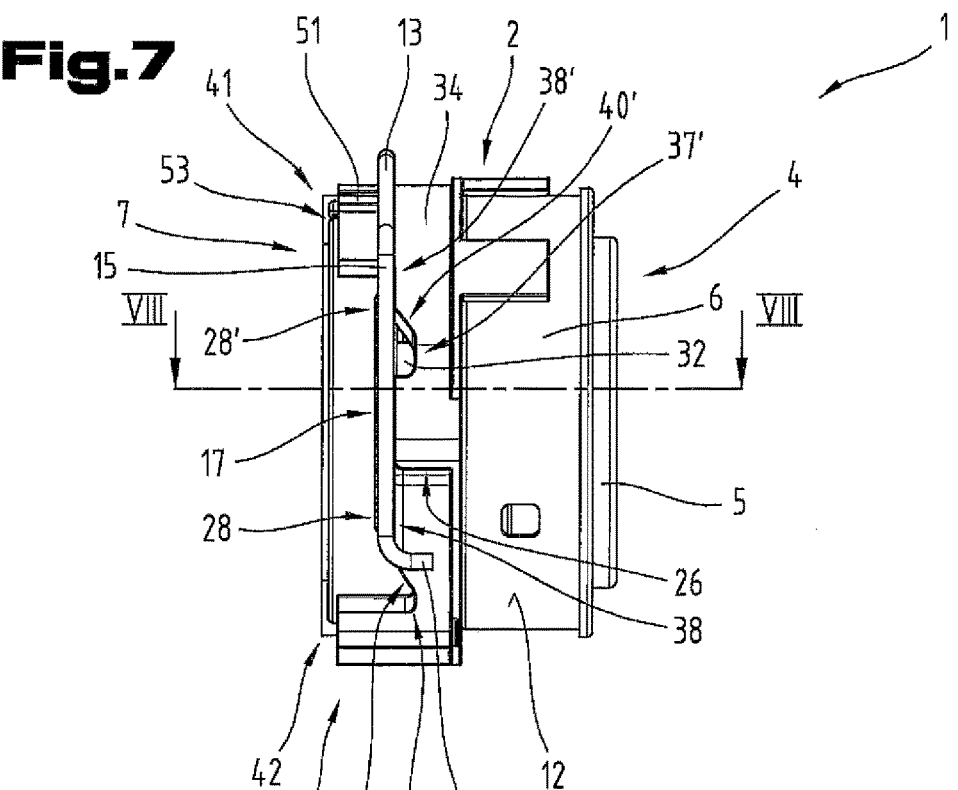
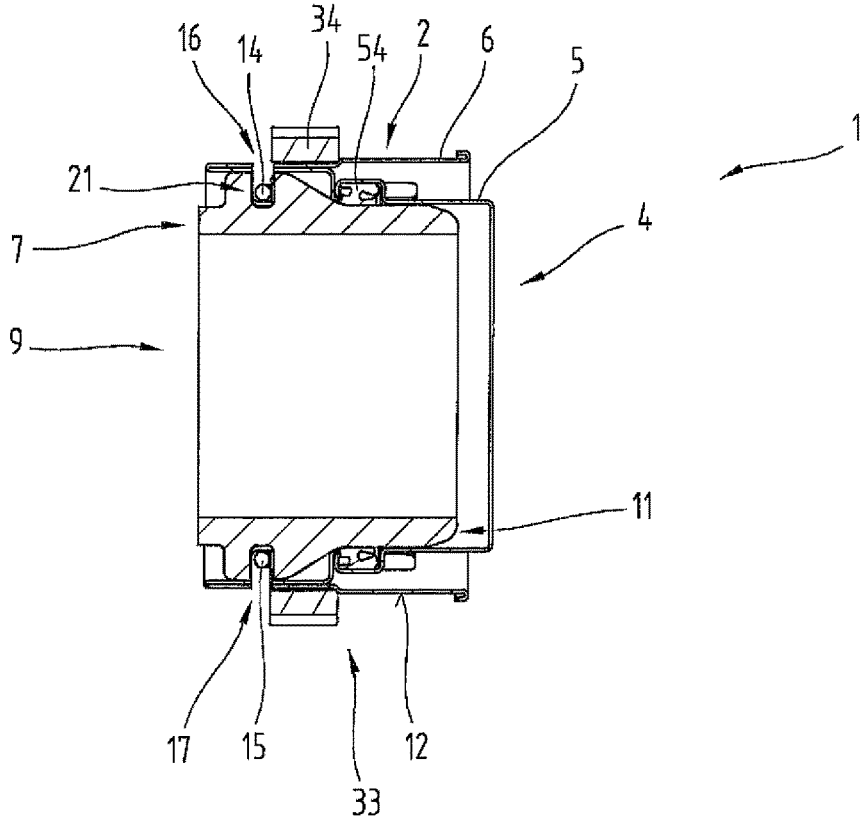

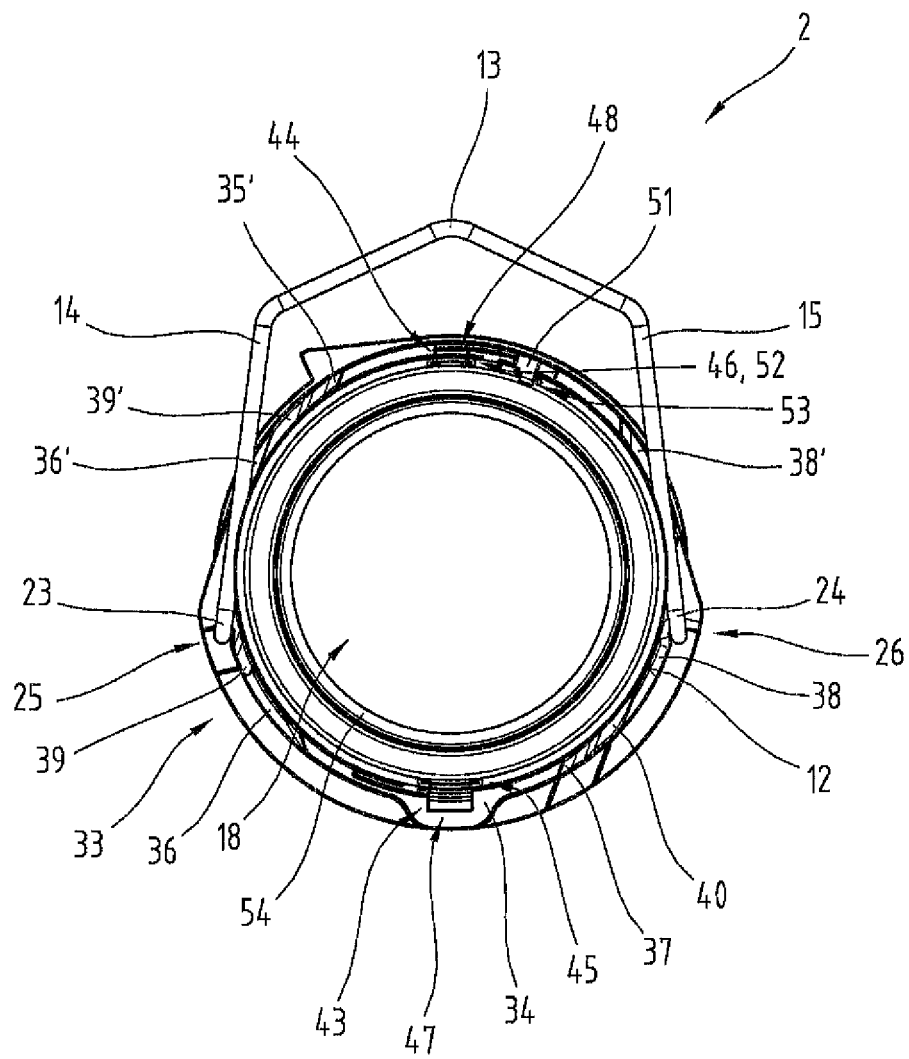

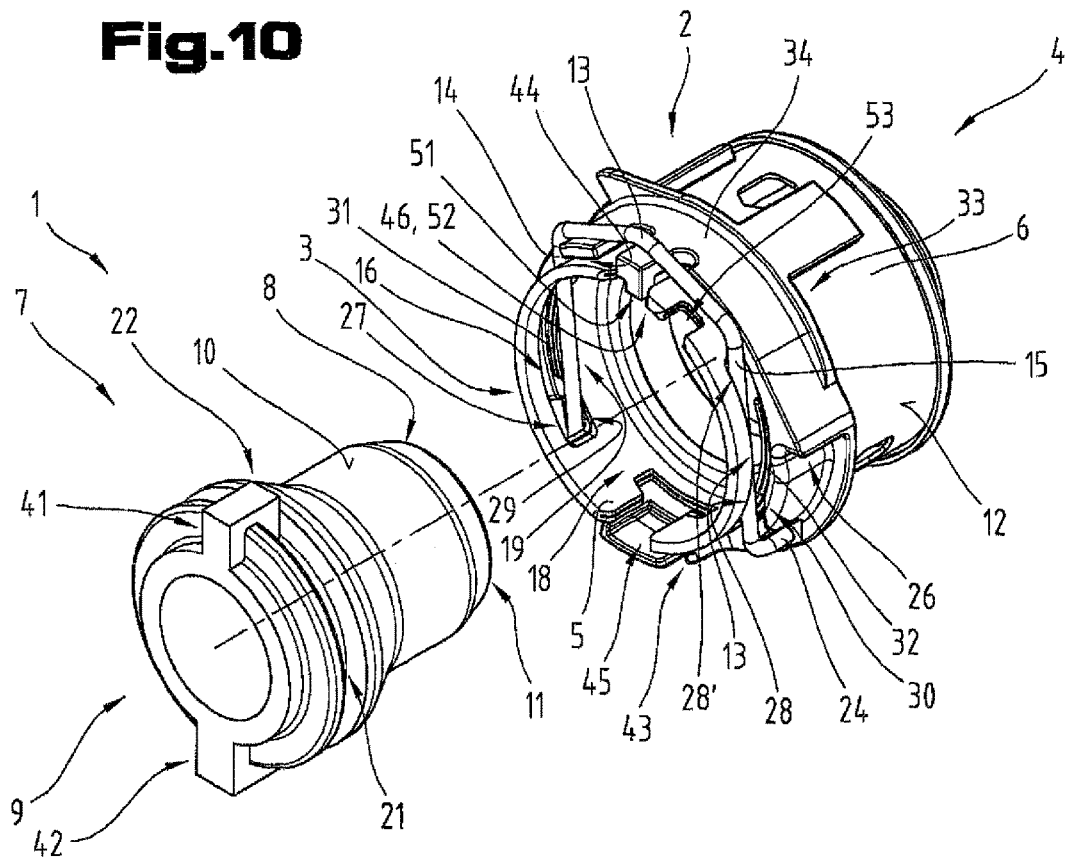
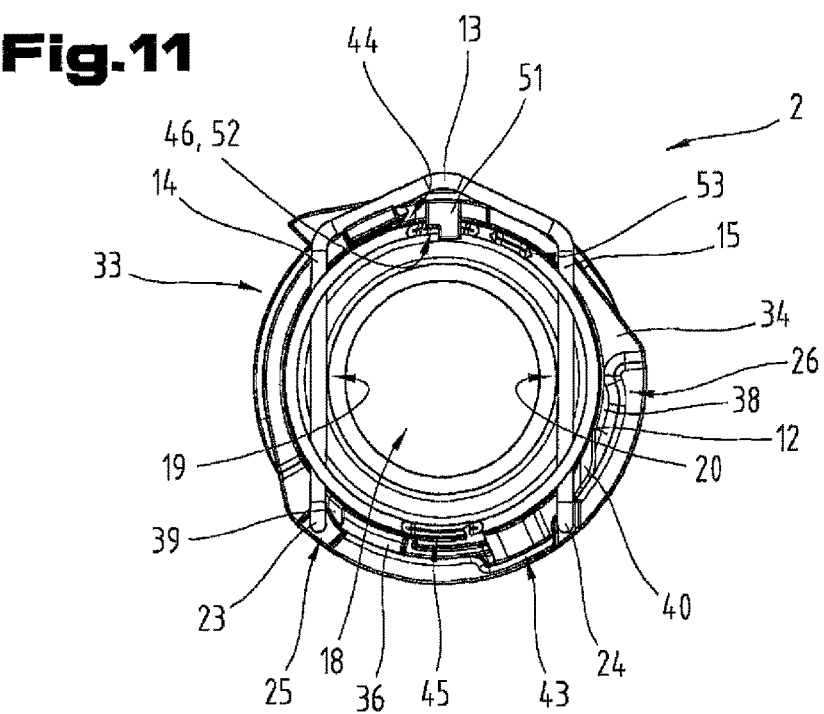

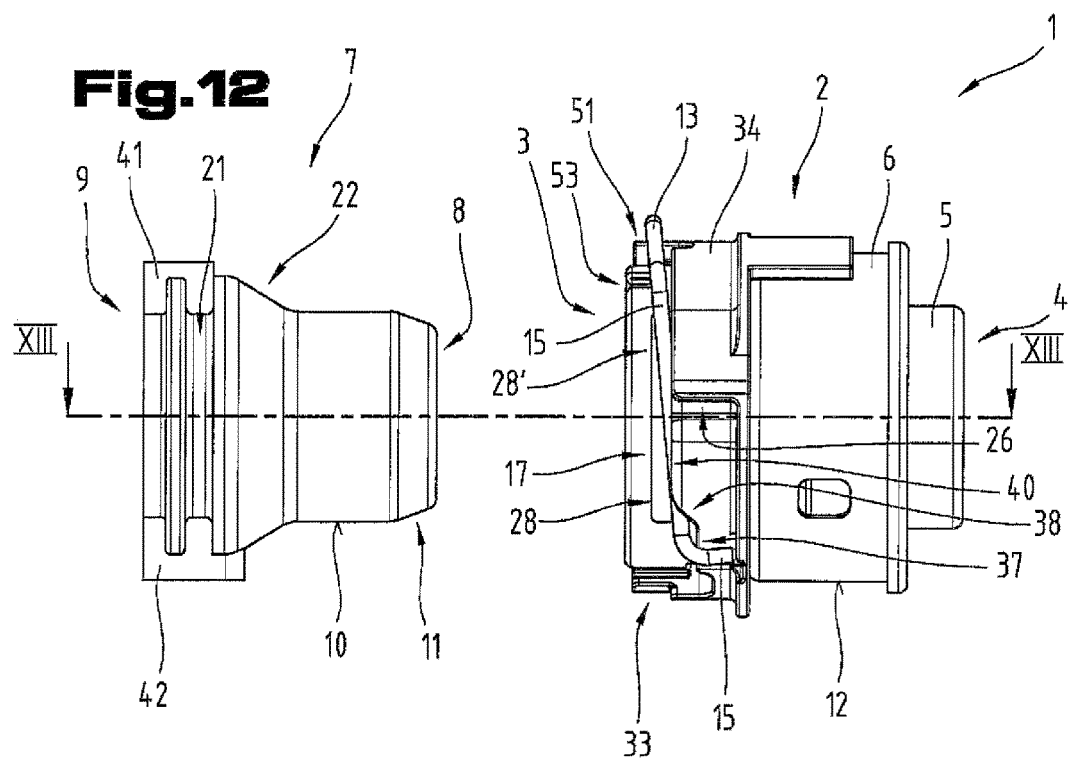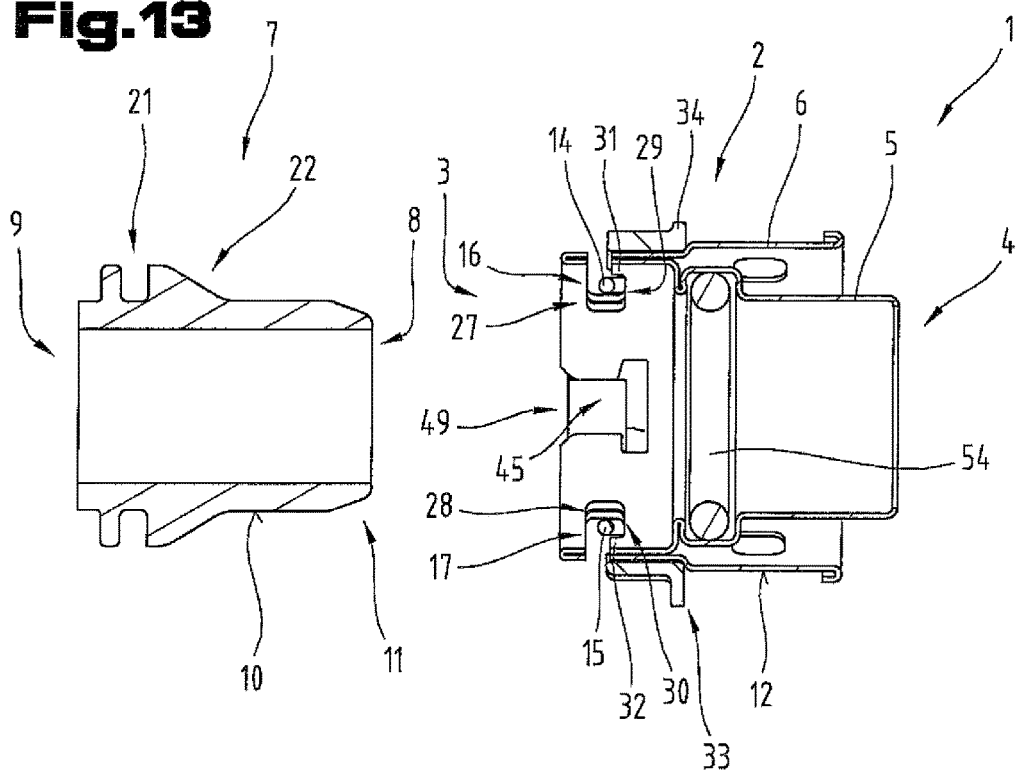

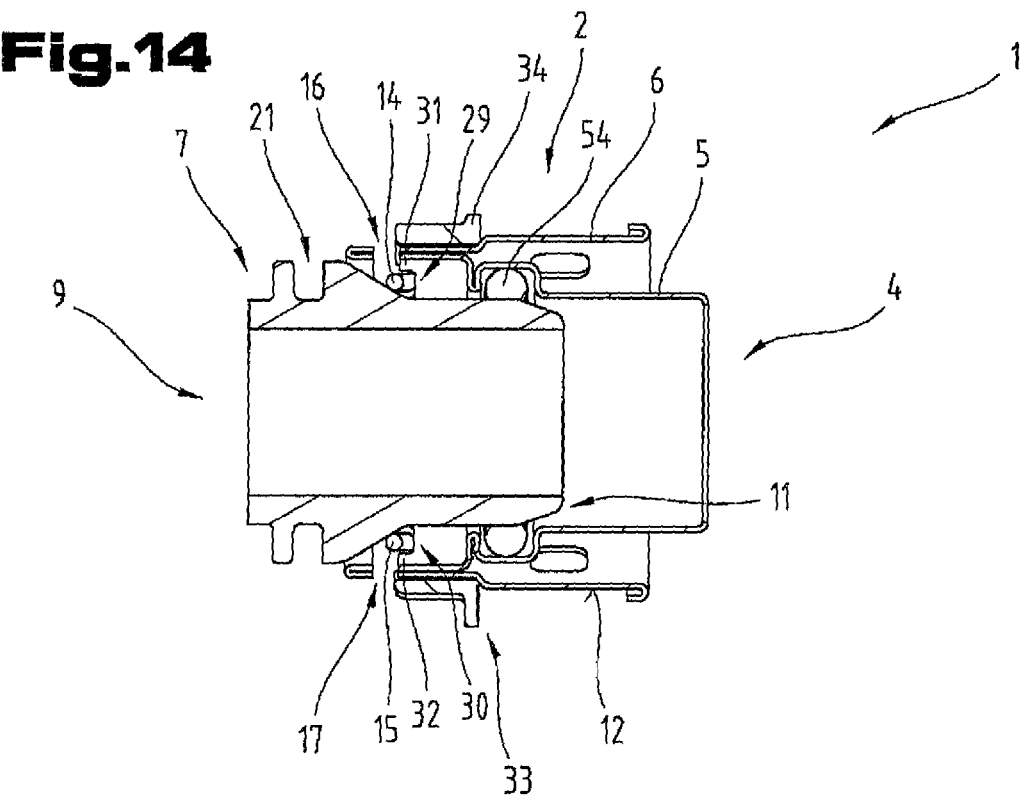
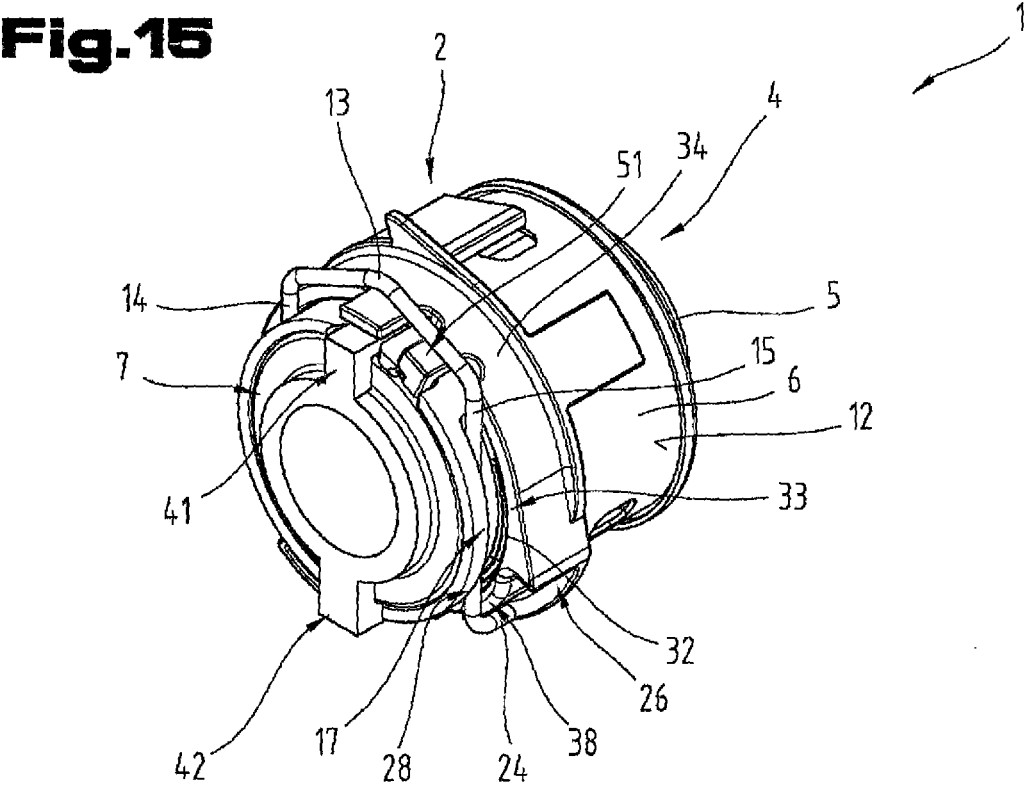

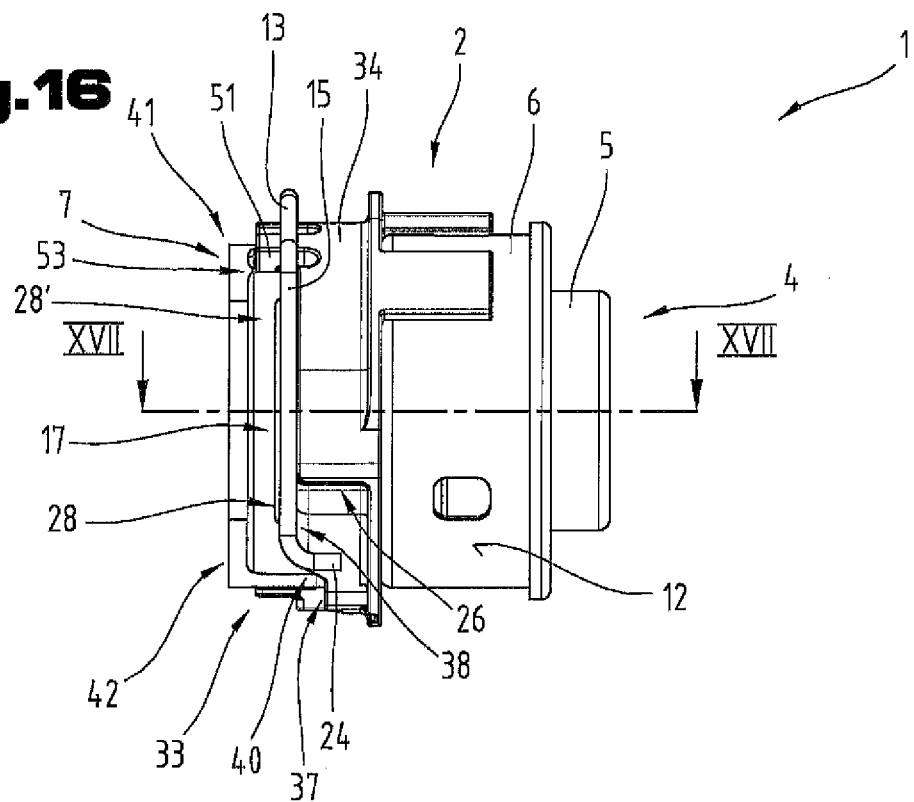
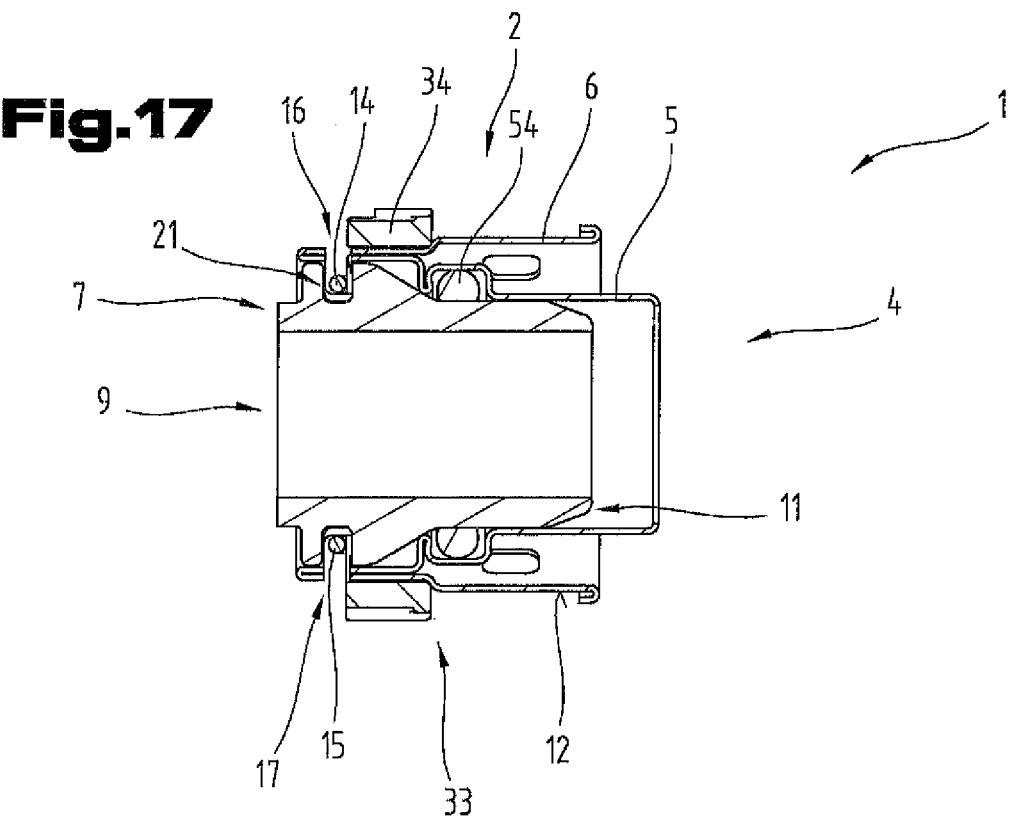

PLUG CONNECTION FOR CONNECTING LINES FOR PRESSURIZED LIQUIDS OR GASES

CROSS REFERENCE TO RELATED APPLICATIONS

This application is the National Stage of PCT/AT2013/050101 filed on May 6, 2013, which claims priority under 35 U.S.C. §119 of Austrian Application No. A 537/2012 filed on May 7, 2012, the disclosures of which are incorporated by reference. The international application under PCT article 21(2) was not published in English.

BACKGROUND OF THE INVENTION

1. Field of the Invention

The invention relates to a plug connection for connecting lines for pressurized liquids or gases, comprising a first plug connector with an insertion end and a fixing end lying axially opposite, a second plug connector with an insertion end and a fixing end lying axially opposite, which second plug connector can be inserted by means of its insertion end in the first plug connector via its insertion end, and a detent spring fastened to or disposed on the first plug connector which, in a closed or active position on the first plug connector and when a second plug connector having at least one retaining portion has been inserted, engages in a groove extending radially at least in a part-portion around an external face of the second plug connector so that the second plug connector inserted in the first plug connector is prevented from becoming loose, and a bevel ramp for the at least one retaining portion of the detent spring extending radially in at least a part-portion is provided between the insertion end and the groove of the second plug connector, preferably directly in front of the groove. A method of using such a plug connection is also specified.

2. The Prior Art

In this connection, it should be pointed out that the expression "use of a plug connection" in this document is intended to mean any use of the plug connection after manufacture of the plug connection, in which case fitting the plug connection of the first and second plug connectors of the plug connection at their fixing ends to the lines to be connected by means of the plug connection constitutes such a use.

WO 2011/106805 A1 and DE 10 2008 027 204 A1 disclose plug connections comprising a first plug connector having a detent spring and a second plug connector having a radially extending groove complementing the detent spring which can be inserted in the first plug connector and methods of using such plug connections, and the second plug connector can be prevented from being fully inserted in the first plug connector by a removable blocking body or filler element in the insertion region of the first plug connector. In WO 2011/106805 A1, it is also stated that the blocking body is fitted in the insertion region of the first plug connector beforehand and that this blocking body is not removed by a fitting device until the first plug connector has been successfully fitted on an end of a line.

With these plug connection systems, however, especially in connection with relatively soft blocking bodies or filler elements and/or second plug connectors made from plastic for example, there is no guarantee that the presence of the blocking body or filler element will prevent the second plug connector from being fully inserted in the first plug connector, especially in the event of an attempted insertion using strong force. Such a malfunction is also more likely due to the fact that only a single blocking body or a single filler element is provided for the first plug connector respectively.

Furthermore, the blocking body or filler element has to be provided and fitted on the first plug connector separately and any involuntary or undesired loosening of the blocking body or filler element from the first plug connector must be prevented as far as possible. Fitting and subsequently removing the blocking body or filler element also requires a complicated and expensive design of the production device and the device used to fit the first plug connector.

SUMMARY OF THE INVENTION

The objective of this invention is to propose a plug connection and a method of using such a plug connection whereby it is possible to ensure in a most safe, simple and inexpensive manner that only properly manufactured plug connectors of the plug connection can be connected to one another.

The first objective of the invention is achieved by means of a plug connection of the type outlined above, whereby the detent spring in the closed position on the first plug connector can be moved from a locked position, in which position the at least one retaining portion is locked to prevent a radially outward movement relative to the first plug connector, into an unlocked position, in which position the movement of the at least one retaining portion radially outwards is unlocked, and on which plug connection a release device is disposed on the first plug connector and can be selectively activated, and the deactivated release device enables the detent spring to be positioned in the locked position and the activated release device holds the detent spring in the unlocked position. This results in a plug connection by means of which a connection of plug connectors that have not been properly manufactured can be prevented in a safe and simple manner because in such a situation, the release device for the detent spring remains deactivated, and because the at least one retaining portion of the detent spring is locked to prevent a movement radially outwards, the second plug connector is reliably prevented from being inserted in the first plug connector. In particular, this offers a very simple way of preventing first plug connectors which have not yet been connected or press-fitted at their fixing end to the line in a fixing operation, or have been so but not correctly, from being connected to a second plug connector because the release device of the detent spring is not activated until during or immediately after a successful fitting operation, which means that the movement of the at least one retaining portion of the detent spring radially outwards is not released until then. Of particular advantage is the fact that with a plug connection based on such a design, no additional manufacturing costs are incurred because no additional components are needed.

In this connection, it is of particular advantage if the detent spring is disposed essentially on an external face of the first plug connector and comprises at least one arm, which arm or at least a part thereof extends through a slot extending radially round a part-portion of the first plug connector into an inner region of the first plug connector when the detent spring is closed and constitutes the at least one retaining portion, and the slot has a recess or wider region facing away from the insertion end of the first plug connector in one of its two end regions for accommodating the at least one arm of the detent spring, which recess extends across less than half the longitudinal extension of the slot, and if the release device is disposed essentially on the external face of the first plug connector and comprises a ring which can be rotated along the longitudinal extension of the slot, which ring has two recessed portions of different depths in the region of the recess of the slot as viewed in the axial direction towards the fixing end of the first plug connector, preferably with a bevel extending in between and, when the ring is turned, either the portion with the greater depth can be moved over the recess so that the recess is exposed and the release device is deactivated or the portion with the lesser depth can be moved over the recess so that the recess is covered and the release device is activated. This offers a particularly simple and inexpensive way of providing a plug connection whereby, depending on the situation, insertion of the second plug connector in the first plug connector can be prevented or enabled. On the one hand, when the release device is deactivated due to the positioning of the at least one arm of the detent spring in the recess of the slot, a movement of the retaining portion of the detent spring radially outwards is reliably prevented or blocked and on the other hand, when the release device is activated due to the recess of the slot being covered or because the at least one arm of the detent spring has moved out of the recess of the slot, a movement of the retaining portion of the detent spring radially outwards is reliably enabled.

In this respect, it is of advantage of several slots are provided and a detent spring having several, corresponding retaining portions, in particular two oppositely lying slots with recesses disposed in mirror image and a detent spring having two arms or retaining portions. As a result of such a multi-sided, in particular two-sided, design of retaining portions a particularly robust but nevertheless still simple and inexpensive plug connection is obtained, whereby when a detent spring is locked, the second plug connector is reliably prevented from being inserted in the first plug connector.

It is also of advantage if the respective slot in the first plug connector has a recess extending across less than half of the longitudinal extension of the slot in the two end regions and the rotatable ring respectively has two portions of different depths in the region of a recess as viewed in the axial direction towards the fixing end of the first plug connector, preferably with a bevel extending in between. This provides a particularly reliable way of locking or blocking a movement of the detent spring radially outwards when the release device is deactivated.

It is also of particular advantage if a portion of the first plug connector, which portion lies directly adjacent to the slot in the direction towards the fixing end of the first plug connector, is specifically provided in the form of a multi-layered sheet metal part. This results in a plug connection with a very high functional safety because the portion of the first plug connector which prevents a movement of the at least one arm of the detent spring radially outwards when the release device is deactivated is of a particularly robust design. This high functional safety and robustness of the plug connection is also enhanced in particular due to the fact that the detent spring is preferably likewise made from metal.

It is of advantage if at least one axially oriented projection is provided on the external face of the second plug connector, which projection can be pushed into at least one co-operating, axially oriented groove having an end face opening at the insertion end of the first plug connector as the second plug connector is being inserted in the first plug connector when the release device is activated, and insertion of the at least one projection in the at least one groove is blocked by the deactivated release device. This contributes to ensuring that the plug connection is reliably locked when the release device is deactivated so that the second plug connector is prevented from being inserted in the first plug connector.

In this connection, it is of advantage if the release device is disposed essentially on the external face of the first plug connector and comprises a ring which is rotatable along the external circumference of the first plug connector, which ring has a first groove portion which is oriented in the radial direction in alignment with a second groove portion in the first plug connector when the release device is activated and which first groove portion is positioned at a distance apart from the second groove portion along the external circumference of the first plug connector when the release device is deactivated by rotating the ring. This results in an additional, particularly simple and inexpensive locking mechanism which requires no additional components.

It is also of advantage if a retaining lug of the release device engages in a first retaining groove when the release device is deactivated and in a second retaining groove when the release device is activated and if the retaining lug can be moved out of the respective retaining groove and together with the release device moved farther to the other respective retaining groove, in particular by applying a mechanical force. This ensures that the release device does not inadvertently or undesirably move from the deactivated position into the activated position or in the reverse direction.

Furthermore, it is of advantage if the detent spring can be moved from the closed or active position on the first plug connector into an open or inactive position on the first plug connector, in which open position the at least one retaining portion of the detent spring is disposed outside the groove in the external face of an inserted second plug connector. This results in a plug connection which enables the first and second plug connector to be separated particularly rapidly and easily, in particular without the aid of an additional tool.

The second objective of the invention is achieved by means of a method of using a plug connection of the type outlined above, whereby prior to using each first plug connector, the detent spring is optionally closed and the release device deactivated, thereby enabling the detent spring to be positioned in the locked position, and whereby in the event of an attempt to insert the second plug connector, the detent spring is either already positioned in the locked position or is moved into the locked position by the bevel ramp of the second plug connector so that the at least one retaining portion of the detent spring is blocked to prevent a movement radially outwards relative to the first plug connector making full insertion of the second plug connector in the first plug connector impossible, and by which method, whilst or directly after successfully attaching a line to the fixing end of the first plug connector by means of a fitting device, the release device of the detent spring is activated so that the detent spring is moved into the unlocked position and is held there, and in the event of an attempt to insert the second plug connector, the at least one retaining portion of the detent spring is moved radially outwards relative to the first plug connector by the bevel ramp of the second plug connector and the second plug connector is fully inserted in the first plug connector and locked by the at least one retaining portion which is then able to engage in the groove of the second plug connector. This provides a particularly simple and reliable way of preventing a plug connector that is not properly manufactured from being assembled to form a closed plug connection because it is only when a line has been successfully fitted on the fixing end of the first plug connector by means of a fitting device or immediately after that the release device of the detent spring is activated and thus enables the second plug connector to be inserted in the first plug connector. This approach also incurs fewer additional costs because in this case, no expensive safeguarding measures are needed in respect of the process of fitting the line on the fixing end of the first plug connector by means of the fitting device and instead, the safeguards can be integrated in the standard process.

It is also of advantage if, prior to using each first plug connector, the detent spring is optionally closed and the release device deactivated by turning the ring on the external face of the first plug connector so that the deeper portion of the ring is moved above the respective recess of the slot of the first plug connector so that the at least one recess is exposed and the at least one arm of the detent spring can be positioned in the at least one recess, and in the event of an attempt to insert the second plug connector, the at least one arm is either already positioned in the at least one recess or is moved by the bevel ramp of the second plug connector into the at least one recess so that the at least one arm is prevented from effecting a movement radially outwards relative to the first plug connector, making it impossible for the second plug connector to be fully inserted in the first plug connector, and if during or immediately after successfully fitting a line on the fixing end of the first plug connector by means of a fitting device, the release device of the detent spring is activated by turning the ring so that the portion of the ring with the less pronounced depth is moved above the respective recess of the slot so that the at least one recess is covered and the at least one arm is preferably moved along the bevel extending between the deeper recessed portion and the less deeply recessed portion out of the at least one recess or the at least one arm is held outside the at least one recess, and in the event of an attempt to insert the second plug connector, the at least one arm is moved relative to the first plug connector radially outwards by the bevel ramp of the second plug connector and the second plug connector can be fully inserted in the first plug connector and locked by the at least one arm which is then able to engage in the groove of the second plug connector. This offers a particularly simple, safe and inexpensive way of locking and releasing the first plug connector with the aid of its detent spring if the first plug connector has not been correctly connected to the line.

In this connection, it is of particular advantage if, during or immediately after successfully fitting the line on the fixing end of the first plug connector, the release device is activated by the device used to fit the line. This offers a particularly high degree of safety because the release device can be activated and the first plug connector released directly during the operation of fitting the line on the fixing end of the first plug connector and can be so without any other intermediate or additional step. The fitting device for the line preferably runs a check on the basis of several process parameters to ascertain whether the fitting operation has been successfully completed or not and if the operation of fitting the line has been successfully completed releases the detent spring of the first plug connector on a fully automated basis. This also keeps costs to a minimum because the fitting device for the line is also used to release the detent spring of the first plug connector.

BRIEF DESCRIPTION OF THE DRAWINGS

To provide a clearer understanding, the invention will be described in more detail below with reference to the appended drawings.

These are highly simplified, schematic diagrams, illustrating the following:

FIG. 3 is a side view of the plug connection illustrated in FIG. 1;

FIG. 4 is a diagram in section showing the plug connection illustrated in FIG. 3 along line IV-IV;

FIG. 7 is a side view of the plug connection illustrated in FIG. 6;

FIG. 8 is a diagram in section showing the plug connection from FIG. 7 along line VIII-VIII;

FIG. 9 shows the first plug connector viewed from the insertion end and with the detent spring on the first plug connector in the open position;

FIG. 10 is a perspective view illustrating two separated plug connectors of a different embodiment of a plug connection with the detent spring on the first plug connector in the closed and locked position;

FIG. 11 shows the first plug connector from FIG. 10 viewed from the insertion end;

FIG. 12 is a side view of the plug connection from FIG. 10;

FIG. 13 is a diagram in section showing the plug connection from FIG. 12 along line XIII-XIII;

FIG. 14 shows the two plug connectors of the other embodiment of the plug connection from FIG. 10 inserted one in the other as far as possible with the detent spring on the first plug connector in the closed and locked position in a diagram in section as in FIG. 13;

FIG. 15 is a perspective view of the two plug connectors of the other embodiment of the plug connection from FIG. 10 inserted fully one in the other with the detent spring on the first plug connector in the closed and unlocked position in which it is held by the release device;

FIG. 16 is a side view of the plug connection illustrated in FIG. 15;

FIG. 17 is a diagram in section showing the plug connection from FIG. 16 along line XVII-XVII.

DETAILED DESCRIPTION OF THE PREFERRED EMBODIMENTS

Figure 1:
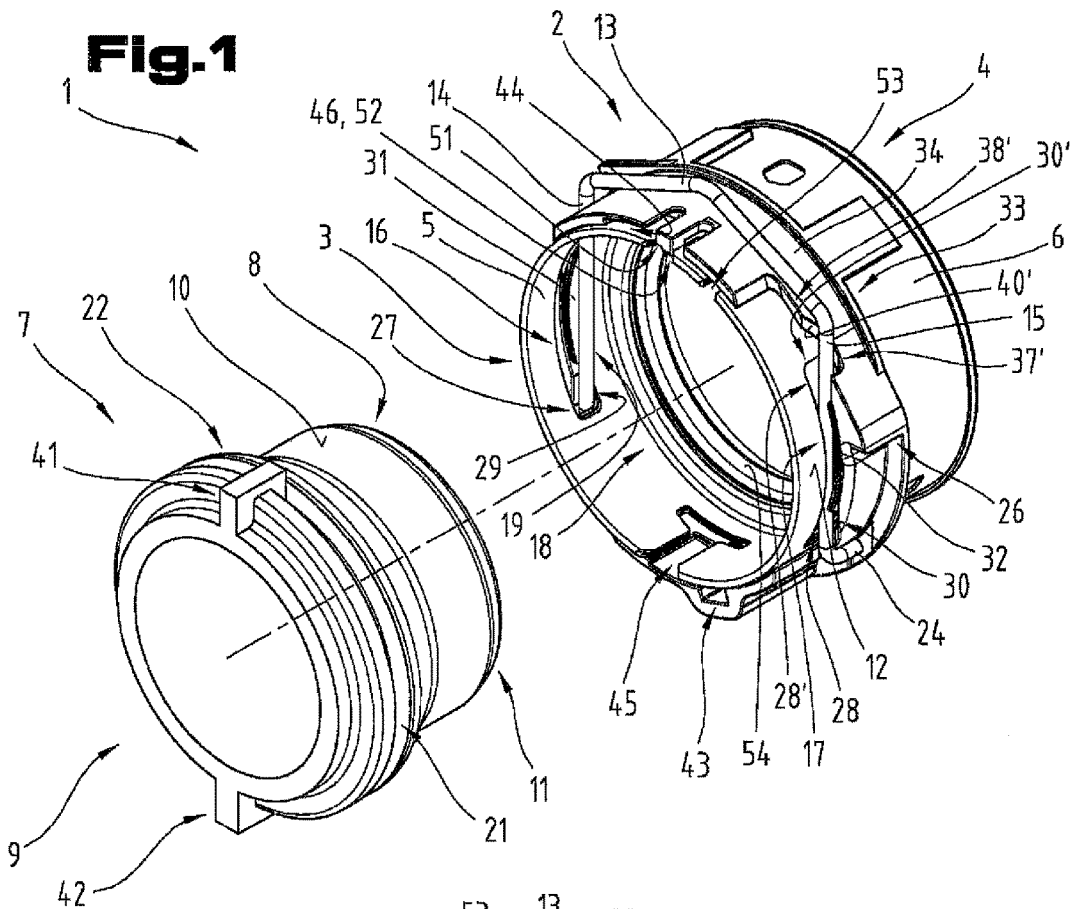
FIG. 1 is a perspective view of the two separated plug connectors of a plug connection with the detent spring on the first plug connector in the closed and locked position.
Figure 2:
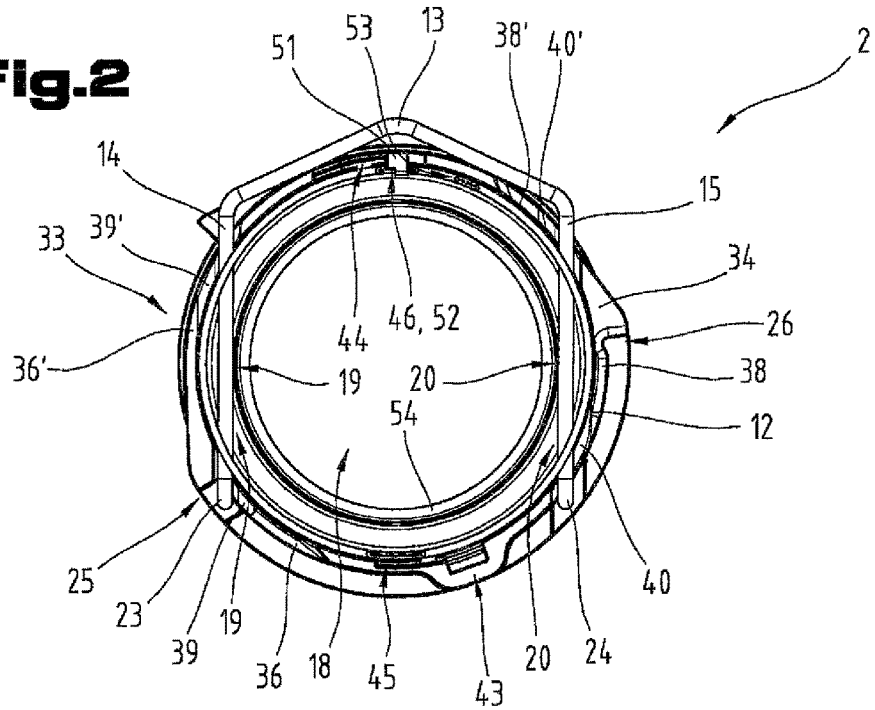
FIG. 2 shows the first plug connector illustrated in FIG. 1 viewed from the insertion end.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIGS. 1 to 9 illustrate different views and different states of a first embodiment of a plug connection 1 for connecting lines for pressurized liquids or gases.

The plug connection 1 comprises a first plug connector 2 with an insertion end 3 and a fixing end 4 lying axially opposite, this first plug connector 2 being connected at its fixing end 4 to a preferably flexible line in a sealing arrangement. To this end, an end portion of the flexible line, which is not illustrated, is disposed on the fixing end 4 of the first plug connector 2 between an internal wall 5 and an external wall 6—see FIG. 4 for example—and the internal wall 6 is deformed or pressed around the circumference radially outwards in the direction towards the flexible line or towards the external wall 6 by means of a fitting device, not illustrated, so that the sealing connection is established between the first plug connector 2 and the end of the flexible line. The internal wall 5 and the external wall 6 are preferably provided in the form of an integral, formed metal part, in particular sheet steel. For the external wall 6 in particular, however, it would also be possible to use a different material such as plastic, for example.

The plug connection 1 further comprises a second plug connector 7 with an insertion end 8 and a fixing end 9 lying axially opposite, which second plug connector 7 can be inserted by its insertion end 8 in the first plug connector 2 via its insertion end 3. In order to make this insertion operation easier, a bevel is provided on the insertion end 8 of the second plug connector 7 on an external face 10 of the second plug connector 7. The second plug connector 7 is preferably attached by its fixing end 9 to a rigid line or to a device, not illustrated, into which device the pressurized liquids or gases are fed and out of which device the pressurized liquids or gases are fed.

At this stage, it should be pointed out that in the case of the embodiments of the plug connection 1 illustrated as examples, solely plug connectors 2, 7 with a round cross-sectional shape are shown but the description would equally apply to plug connections 1 or plug connectors 2, 7 with polygonal, in particular rectangular or square, cross-sectional shapes.

In order to lock the second plug connector 7 in the first plug connector 2 when inserted in the first plug connector 2 to prevent the inserted second plug connector 7 from becoming loose from the first plug connector 2, a detent spring 13 with two arms 14, 15 is fastened to an essentially external face 12 of the first plug connector 2, based on the embodiment illustrated as an example here. When the detent spring 13 is in a closed position as illustrated in FIG. 1 for example, the two arms 14, 15 respectively extend through a slot 16, 17 extending radially around the circumference in a part-portion of the first plug connector 2 into an inner region 18 of the first plug connector 2 and form two retaining portions 19, 20. Disposed on the external face 10 of the second plug connector 7 is a radially extending groove 21 which lies in the same plane as the slots 16, 17 of the first plug connector 2 when the second plug connector 7 is fully inserted in the first plug connector 2 so that the retaining portions 19, 20 of the closed detent spring 13 are able to engage through the slots 16, 17 in the groove 21 of the second plug connector 7, thereby preventing the second plug connector 7 inserted in the first plug connector 2 from becoming loose.

A radially extending bevel ramp 22 for the two retaining portions 19, 20 of the detent spring 13 is disposed between the insertion end 8 and the groove 21 of the second plug connector 7 directly in front of the groove 21, which bevel ramp 22 specifically forms a side wall of the groove 21 and which bevel ramp 22 moves or forces the two retaining portions 19, 20 of the closed detent spring 13 radially apart from one another as the second plug connector 7 is being inserted in the first plug connector 2, thereby making it possible for the second plug connector 7 to be inserted in the first plug connector 2. It is not absolutely necessary to provide the bevel ramp 22, however. The function of forcing the retaining portions 19, 20 of the closed detent spring 13 apart can be achieved by adapting the dimensions or diameter of the plug connection 1 from the bevel on the insertion end 8 of the second plug connector 7 accordingly.

FIG. 9 illustrates the detent spring 13 after it has been moved from the closed position on the first plug connector 2 into an open position on the first plug connector 2. In the embodiment illustrated as an example, each arm 14, 15 of the detent spring 13 has an angled end portion 23, 24 at the bottom, open end, which angled end portions 23, 24 latch into retaining devices 25, 26 on the first plug connector 2 and hold the detent spring 13 in the open position. The detent spring 13 can be moved from the closed or active position into the open or inactive position and from the open position into the closed position preferably along a path oriented radially with respect to the first plug connector 2. The essential aspect is that the arms 14, 15 of the detent spring 13 are moved apart from one another when the detent spring 13 is in the open position so that the arms 14, 15 no longer extend through the slots 16, 17 into the inner region 18 of the first plug connector 2 and the retaining portions 19, 20 of the detent spring 13 therefore no longer engage in the groove 21 in the external face 10 of the second plug connector 7 when the second plug connector 7 is inserted.

As may best be seen from FIG. 1, each of the two slots 16, 17 of the first plug connector 12 has a recess 29, 29', 30, 30' or wider region facing away from the insertion end 3 of the first plug connector 2 in each of its two end regions 27, 27', 28, 28' for accommodating the respective arm 14, 15 of the detent spring 13 in this embodiment, and each recess extends across less than half the longitudinal extension of the corresponding slot 16, 17. The recess 29, 29', 30, 30' itself may best be seen in FIG. 4.

The arms 14, 15 and hence the detent spring 13 can therefore be moved from an unlocked position, in which position the respective arm 14, 15 is disposed in alignment with the respective slot 16, 17 so that the corresponding retaining portion 19, 20 of the arm 14, 15 is able to move radially outwards in a movement towards the first plug connector 2 relative to the axial direction into a locked position, in which position the respective arm 14, 15 is disposed in the co-operating two recesses 29, 29', 30, 30' so that the corresponding retaining portion 19, 20 of the respective arm 14, 15 is prevented from effecting a movement radially outwards. When the detent spring 13 is in the locked position, a projecting portion 31, 32 of the first plug connector 2 directly adjacent to the respective slot 16, 17 in the direction towards the fixing end 4 of the first plug connector moves the respective retaining portion 19, 20 radially outwards because the arms 14, 15 are positioned in the recesses 29, 29', 30, 30'.

Also disposed essentially on the external face 12 of the first plug connector 2 is a release device 33 comprising a ring 34 disposed in a cuff-type arrangement and rotatable along the longitudinal extension of the slots 16, 17. The ring 34 of the release device 33 lies on the external face 12 of the first plug connector 2 above the slots 16, 17 and has, in the region of each recess 29, 29', 30, 30' of the slots 16, 17, respectively two differently recessed portions 35, 36, 35', 36', 37, 38, 37', 38' in the axial direction towards the fixing end 4 of the first plug connector 2, and a bevel 39, 39', 40, 40' extends in between, respectively between the two adjacently lying portions 35, 36, 35', 36', 37, 38, 37', 38'. By rotating the ring 34 in one of the two possible directions of rotation, either the deeper recessed portions 35, 35', 37, 37' are moved above the respective recess 29, 29', 30, 30' so that the respective recess 29, 29', 30, 30' is exposed and the release device 33 is deactivated or the less deeply recessed portions 36, 36', 38, 38' can be moved above the respective recess 29, 29', 30, 30' so that the respective recess 29, 29', 30, 30' is covered and the release device 33 is activated. The differently recessed portions 35, 35', 36, 36', 37, 37', 38, 38' of the ring 34 and the bevels 39, 39', 40, 40' extending respectively in between may best be seen FIGS. 3 and 7. The selectively activatable release device 33 comprising the ring 34 is therefore designed so that the deactivated release device 33 enables the detent spring 13 to be positioned in the locked position because the recesses 29, 29', 30, 30' are exposed by the deeper recessed portions 35, 35', 37, 37' of the ring 34 and the activated release device 33 holds the detent spring 13 in the unlocked position because the recesses 29, 29', 30, 30' are covered by the less deeply recessed portions 36, 36', 38, 38' of the ring 34.

Based on the embodiments of the plug connection 1 illustrated, the projecting portions 31, 32 of the first plug connector 2, which portions 31, 32 lie directly adjacent to the slots 16, 17 in the direction towards the fixing end 4 of the first plug connector 2, are formed by a two-layered sheet metal part. Consequently, the portions 31, 32 which prevent the arms 14, 15 of the detent spring 13 from moving radially outwards in the locked position have a higher strength or stability.

Based on one particularly practical method of using the plug connection 1, before using the first plug connector 2, i.e. in particular also before fitting the line to the fixing end 4 of the first plug connector 2, the detent spring 13 of the first plug connector 2 is optionally closed, i.e. if the detent spring 13 is not already in the closed position, and the release device 33 is deactivated if this is not already the case. Based on a particularly practical approach, the detent spring 13 is closed and the release device 33 deactivated as part of the manufacturing process of the first plug connector 2 already.

Figure 5:
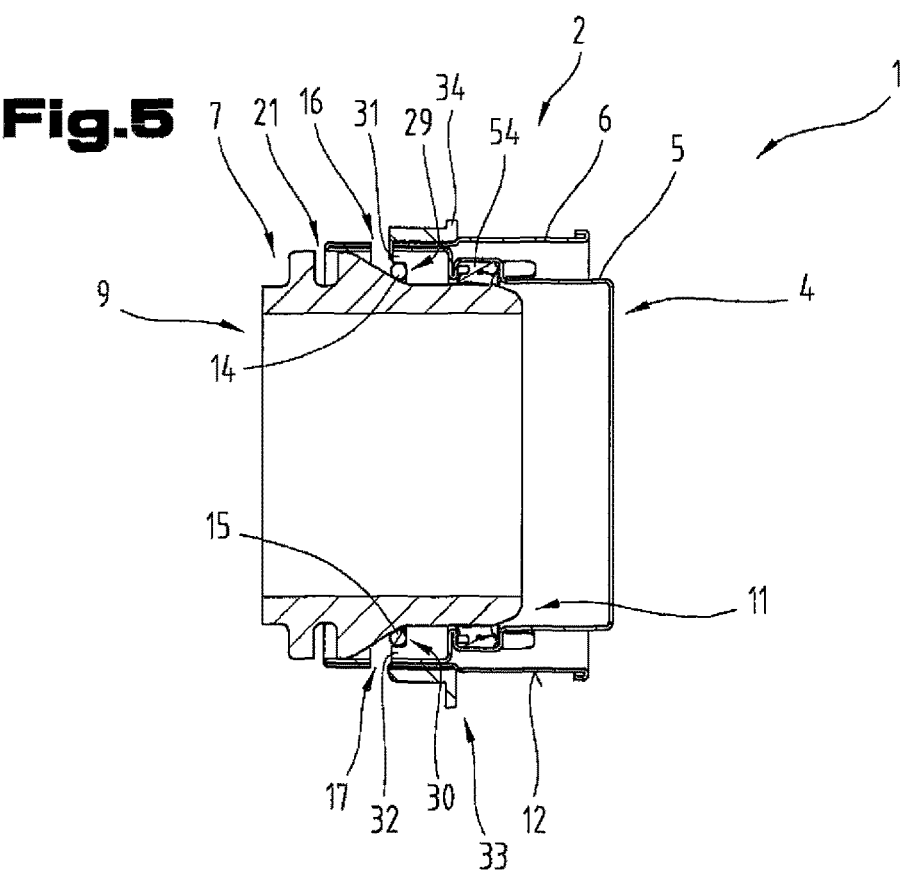
FIG. 5 shows the two plug connectors of the plug connection from FIG. 1 inserted one in the other as far as possible with the detent spring on the first plug connector in the closed and locked position, viewed in section as in FIG. 4.

Deactivating the release device 33 enables the detent spring 13 to be positioned in the locked position and in the event of an attempt to insert the second plug connector 7, the detent spring 13 is therefore either already positioned in the locked position or the detent spring 13 is moved by the bevel ramp 22 of the second plug connector 7 into the locked position so that the retaining portions 19, 20 of the detent spring 13 are prevented by the projecting portions 31, 32 of the first plug connector 2 from moving radially outwards relative to the first plug connector 2 and it is impossible to insert the second plug connector 7 fully in the first plug connector 2. When the plug connection 1 is in the state illustrated in FIGS. 1 to 5, the release device 33 allows the detent spring 13 to be positioned in the locked position and the detent spring 13 is also disposed in this locked position. The diagram in section illustrated in FIG. 5 illustrates how far the second plug connector 7 can be inserted in the first plug connector 2 when the detent spring 13 is locked before the locked detent spring 13 and its blocked retaining portions 19, 20 prevent further or full insertion of the second plug connector 7.

When a line has been fitted on the fixing end 4 of the first plug connector 2 in a sealing arrangement by means of a fitting device and the internal wall 5 has been pressed in the region of the fixing end 4 of the first plug connector 2, the release device 33 of the detent spring 13 is activated but only if the pressing operation has been successfully completed—which will be determined on a fully automated basis in particular by the fitting device—so that the detent spring 13 is moved into the unlocked position and held there. If the detent spring 13 is initially in the locked position and the release device 33 is activated by rotating the ring 34, the less deeply recessed portions 36, 36', 38, 38' of the ring 34 are moved above the recesses 29, 29', 30, 30' of the slots 16, 17 so that the recesses 29, 29', 30, 30' are covered and the arms 14, 15' are moved along the bevels 39, 39', 40, 40' extending respectively between the deeper recessed portions 35, 35', 37, 37' and less deeply recessed portions 36, 36', 38, 38' out of the recesses 29, 29', 30, 30'. The arms 14, 15 and the retaining portions 19, 20 of the detent spring 13 are therefore pushed out of the recesses 29, 29', 30, 30' and into the same plane as the slots 16, 17, and the projecting portions 31, 32 of the first plug connector 2 in the region of the slots 16, 17 no longer prevent a movement of the retaining portions 19, 20 of the detent spring 13 oriented radially outwards.

For this reason, if insertion is attempted, the bevel ramp 22 of the second plug connector moves or forces the retaining portions 19, 20 of the detent spring 13 radially outwards relative to the first plug connector 2 and the second plug connector 7 can be fully inserted in the first plug connector 2. Once the second plug connector 7 has been fully inserted in the first plug connector, the pushed-apart and tensed detent spring 13 moves back into its original position and engages in the groove 21 of the second plug connector 7 by means of its retaining portions 19, 20 so that it is locked in the first plug connector 2. This connected state of the plug connection 1 is illustrated particularly clearly in FIG. 8. FIGS. 6 to 9 illustrate the plug connection 1 in a state in which the release device 33 is activated and the lock of the detent spring 13 is to a certain extent "disarmed".

It is of particular practical advantage if, whilst or immediately after the line has been successfully fitted to the fixing end 4 of the first plug connector 2 by means of the fitting device, the release device 33 is likewise activated by the fitting device. This can be achieved in a particularly simple and rapid manner whereby the fitting device turns the ring 34 of the release device 33 so that the release device 33 is switched from the deactivated state into the activated state.

Based on one particularly practical embodiment, the second plug connector 7 is provided with at least one, as illustrated in FIG. 1, but preferably two axially oriented projections 41, 42 on the external face 10. Co-operating therewith, the rotatable ring 34 of the release device 33 respectively has a first groove portion 43, 44 which is oriented in the radial direction in alignment respectively with a second groove portion 45, 46 in the first plug connector 2 when the release device 33 is activated, and which respective first groove portion 43, 44 is positioned at a distance apart from the respective second groove portion 45, 46 along the external circumference of the first plug connector 2 when the release device 33 is deactivated by turning the ring 34.

Figure 6:
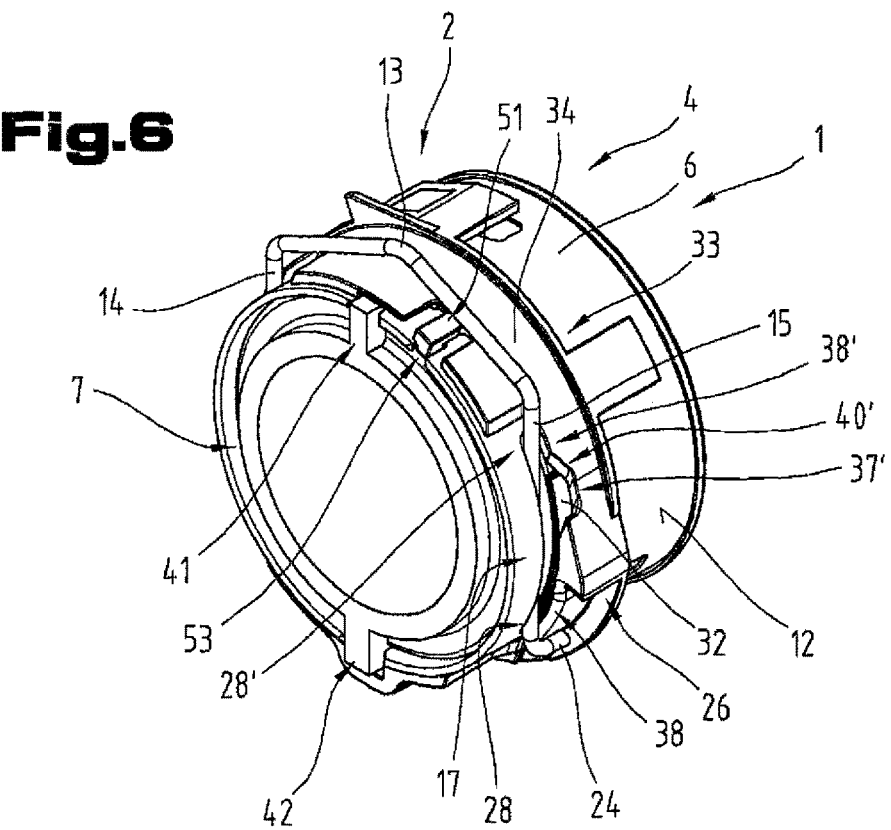
FIG. 6 is a perspective view illustrating the two plug connectors of the plug connection from FIG. 1 fully inserted one in the other with the detent spring on the first plug connector in the closed and unlocked position where it is held by the release device.

Accordingly, when the release device 33 is activated, respectively a first groove portion 43, 44 and a second groove portion 45, 46 oriented radially in alignment with it each form an axially oriented groove 47, 48, each with an end face opening 49, 50 at the insertion end 3 of the first plug connector 2, as may best be seen in FIGS. 6 and 9, and the axially oriented projections 41, 42 of the second plug connector 7 can be pushed into the co-operating, axially oriented grooves 47, 48 in the insertion end 3 of the first plug connector 2, after which the second plug connector 7 can be inserted in the first plug connector 2.

If the release device 33 is now deactivated and hence the ring 34 turned so that the respective first groove portion 43, 44 in the ring 34 is not oriented in radial alignment with the respective second groove portion 45, 46 in the first plug connector 2, the respective groove 47, 48 for accommodating the respective projection 41, 42 is blocked or not even available and the second plug connector 7 is prevented from being inserted in the first plug connector 2 by this in addition to the blocked detent spring 13.

The projections 41, 42 on the second plug connector 7 also act as a lock to prevent any rotation in the first plug connector 2.

Based on another practical embodiment of the plug connection 1, the release device 33 or ring 34 is provided with a retaining lug 51, which retaining lug 51 engages in a first retaining groove 52 when the release device 33 is deactivated and engages in a second retaining groove 53 when the release device 33 is activated and the retaining lug 51 can be moved or bent out of the respective retaining groove 52, 53 by a mechanical force and together with the ring 34, the release device 33 can be moved respectively above a specific retaining groove 52, 53. As soon as the retaining lug 51 is disposed in alignment with a retaining groove 52, 53 and a mechanical force is no longer being applied to the retaining lug 51, the retaining lug 1 moves into the respective retaining groove 52, 53 due to its pre-tensioning and locks the ring 34 of the release device 33 in the activated or deactivated state just selected.

Based on one particularly practical embodiment, a sealing element 54 projecting radially inwards is provided in a groove in the internal wall 5 of the first plug connector 2 which, as clearly illustrated in FIG. 8, lies against the external face 10 of the second plug connector 7 when the second plug connector 7 is inserted and seals the two plug connectors 2, 7 to one another and the plug connection 1.

FIGS. 10 to 17 illustrate another embodiment of the plug connection 1, the same reference numbers and component names being used as those relating to FIGS. 1 to 9 above. To avoid unnecessary repetition, reference may be made to the more detailed description of FIGS. 1 to 9 given above. The embodiment of the plug connection 1 illustrated in FIGS. 10 to 17 differs from the embodiment described above in connection with FIGS. 1 to 9 due to the dimensions or size of the components of the plug connection 1. However, the main thing is that with this other embodiment of the plug connection 1, when the release device 33 is deactivated, only one recess 29, 30 per slot 16, 17 is made accessible respectively by the deeper recessed portions 35, 37 of the ring 34 of the release device 33.

This is achieved either as with the embodiment illustrated in FIGS. 10 to 17 where the ring 34 of the release device 33 has differently recessed portions 35, 36, 37, 38 solely in the region of these recesses 29, 30 of the slots 16, 17 or alternatively, due to the fact that a slot 16, 17 has precisely one recess 29, 30 only in an end region 27, 28.

To achieve this, it is also necessary for the two recesses 29, 30 that are accessible when the release device 33 is deactivated to be disposed along the vertical longitudinal mid-plane of the first plug connector 2—see FIG. 10—in mirror image in the respective end region 27, 28 of the slots 16, 17 so that when the release device is deactivated, the detent spring 13 and its arms 14, 15 can be positioned at an angle with respect to a vertical cross-sectional plane of the first plug connector 2 and the retaining portions 19, 20 of the detent spring 13 are blocked to prevent a movement radially outwards, as may best be seen in FIG. 12.

For the sake of good order, finally, it should be pointed out that, in order to provide a clearer understanding of the structure of the plug connection, it and its constituent parts are illustrated to a certain extent out of scale and/or on an enlarged scale and/or on a reduced scale.

The embodiments illustrated as examples represent possible variants of the plug connection, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

The objective underlying the independent inventive solutions may be found in the description.

Above all, the individual embodiments of the subject matter illustrated in FIGS. 1 to 9; 10 to 17 constitute independent solutions proposed by the invention in their own right. The objectives and associated solutions proposed by the invention may be found in the detailed descriptions of these drawings.

| List of reference numbers | |
|---|---|
| 1 | Plug connection |
| 2 | First plug connector |
| 3 | Insertion end |
| 4 | Fixing end |
| 5 | Internal wall |
| 6 | External wall |
| 7 | Second plug connector |
| 8 | Insertion end |
| 9 | Fixing end |
| 10 | External face |
| 11 | Bevel |
| 12 | External face |
| 13 | Detent spring |
| 14 | Arm |
| 15 | Arm |
| 16 | Slot |
| 17 | Slot |
| 18 | Inner region |
| 19 | Retaining portion |
| 20 | Retaining portion |
| 21 | Groove |
| 22 | Bevel ramp |
| 23 | End portion |
| 24 | End portion |
| 25 | Retaining device |
| 26 | Retaining device |
| 27, 27' | End region |
| 28, 28' | End region |
| 29, 29' | Recess |
| 30, 30' | Recess |
| 31 | Portion |
| 32 | Portion |
| 33 | Release device |
| 34 | Ring |
| 35, 35' | Portion |
| 36, 36' | Portion |
| 37, 37' | Portion |
| 38, 38' | Portion |
| 39, 39' | Bevel |
| 40, 40' | Bevel |
| 41 | Projection |
| 42 | Projection |
| 43 | First groove portion |
| 44 | First groove portion |
| 45 | Second groove portion |
| 46 | Second groove portion |
| 47 | Groove |
| 48 | Groove |

-continued

List of reference numbers

| | |
|---|---|
| 49 | End face opening |
| 50 | End face opening |
| 51 | Retaining lug |
| 52 | First retaining groove |
| 53 | Second retaining groove |
| 54 | Sealing element |

The invention claimed is:

1. A plug connection for connecting lines for pressurized liquids or gases, comprising:
   a first plug connector having an insertion end and a fixing end lying axially opposite,
   a second plug connector having an insertion end and a fixing end lying axially opposite, and the second plug connector can be inserted by its insertion end in the first plug connector via its insertion end,
   a detent spring fastened to the first plug connector which, in a closed position on the first plug connector and when the second plug connector is inserted, engages in a radially extending groove in an external face of the second plug connector via at least one retaining portion so that the second plug connector inserted in the first plug connector is prevented from becoming loose, and
   a radially extending bevel ramp for the at least one retaining portion of the detent spring between the insertion end and the groove of the second plug connector,
   wherein the detent spring in the closed position on the first plug connector is configured to be moved from a locked position into an unlocked position,
   wherein in the locked position the at least one retaining portion is blocked relative to the first plug connector to prevent a movement radially outwards,
   wherein in the unlocked position, movement of the at least one retaining portion radially outwards is unblocked,
   wherein a release device which can be selectively activated is disposed on the first plug connector,
   wherein the release device when deactivated enables the detent spring to be positioned in the locked position and the release device when activated is configured to hold the detent spring in the unlocked position,
   wherein the detent spring is essentially disposed on an external face of the first plug connector and comprises at least one arm, which arm extends through a radially extending slot in a part-portion of the first plug connector into an inner region of the first plug connector when the detent spring is closed and forms the at least one retaining portion,
   wherein the slot has a recess or wider region facing away from the insertion end of the first plug connector in one of its two end regions for accommodating the at least one arm of the detent spring,
   wherein the recess or the wider region extends across less than half the longitudinal extension of the slot,
   wherein the release device is essentially disposed on the external face of the first plug connector and comprises a ring rotatable along the longitudinal extension of the slot, and
   wherein the ring has two differently recessed portions in the region of the recess of the slot towards the fixing end of the first plug connector as viewed in the axial direction, and by rotating the ring, either the deeper recessed portion can be moved above the recess so that the recess is exposed and the release device is deactivated or the less deeply recessed portion can be moved above the recess so that the recess is covered and the release device is activated.

2. The plug connection according to claim 1, wherein several slots and a detent spring with several corresponding retaining portions are provided.

3. The plug connection according to claim 1, wherein the respective slot in the first plug connector has a recess respectively extending across less than half the longitudinal extension of the slot in two end regions and the rotatable ring has respectively two differently recessed portions in the region of the recess towards the fixing end of the first plug connector as viewed in the axial direction.

4. The plug connection according to claim 1, wherein a portion of the first plug connector, which portion lies directly adjacent to the slot in the direction towards the fixing end of the first plug connector, is provided in the form of a multi-layered sheet metal part in particular.

5. The plug connection according to claim 1, wherein at least one axially oriented projection is provided on the external face of the second plug connector, which projection can be pushed into at least one co-operating axially oriented groove with an end face opening at the insertion end of the first plug connector if the release device is activated when the second plug connector is being inserted in the first plug connector, and the at least one projection is prevented from being pushed into the at least one groove if the release device is deactivated.

6. The plug connection according to claim 1, wherein a retaining lug of the release device engages in a first retaining groove when the release device is deactivated and in a second retaining groove when the release device is activated, and the retaining lug can be moved out of the respective retaining groove and can be moved together with the release device to the other respective retaining groove.

7. The plug connection according to claim 1, wherein the detent spring can be moved from the closed position on the first plug connector into an open position on the first plug connector, in which open position the at least one retaining portion of the detent spring is disposed outside the groove in the external face of an inserted second plug connector.

8. A method of using a plug connection according to claim 1, wherein before using each first plug connector, the detent spring is optionally closed and the release device is deactivated by turning the ring on the external face of the first plug connector so that the respectively deeper recessed portion of the ring is moved above the respective recess of the slot of the first plug connector, thereby exposing the at least one recess enabling the at least one arm of the detent spring to be moved into the at least one recess such that the detent spring is positioned in the locked position,
   wherein in the event of an attempt to insert the second plug connector, the at least one arm of the detent spring is either already positioned in the at least one recess or is moved into the at least one recess by the bevel ramp of the second plug connector so that the at least one arm of the detent spring is prevented from effecting a movement radially outwards relative to the first plug connector making full insertion of the second plug connector in the first plug connector impossible,
   wherein during or immediately after a line has been successfully fitted to the fixing end of the first plug connector via a fitting device, the release device of the detent spring is activated by turning the ring so that respectively the less deeply recessed portion of the ring is moved above the respective recess of the slot so that the at least one recess is covered and the at least one arm is moved out of the at least one recess or the at least one arm is held outside the at least one recess, and wherein in the event of an attempt to insert the second plug connector, the at least one arm of the detent spring is moved radially outwards relative to the first plug connector by the bevel ramp of the second plug connector and the second plug connector is fully inserted in the first plug connector and locked by the at least one arm which can then engage in the groove of the second plug connector.

9. The method according to claim 8, wherein during or immediately after the line has been successfully fitted to the fixing end of the first plug connector, the release device is activated by the fitting device for the line.

10. A plug connection for connecting lines for pressurized liquids or gases, comprising:
- a first plug connector having an insertion end and a fixing end lying axially opposite,
- a second plug connector having an insertion end and a fixing end lying axially opposite, and the second plug connector can be inserted by its insertion end in the first plug connector via its insertion end,
- a detent spring fastened to the first plug connector which, in a closed position on the first plug connector and when the second plug connector is inserted, engages in a radially extending groove in an external face of the second plug connector via at least one retaining portion so that the second plug connector inserted in the first plug connector is prevented from becoming loose, and
- a radially extending bevel ramp for the at least one retaining portion of the detent spring between the insertion end and the groove of the second plug connector,
- wherein the detent spring in the closed position on the first plug connector is configured to be moved from a locked position into an unlocked position,
- wherein in the locked position the at least one retaining portion is blocked relative to the first plug connector to prevent a movement radially outwards,
- wherein in the unlocked position, movement of the at least one retaining portion radially outwards is unblocked in the unlocked position,
- wherein a release device which can be selectively activated is disposed on the first plug connector,
- wherein the release device when deactivated enables the detent spring to be positioned in the locked position and the release device when activated is configured to hold the detent spring in the unlocked position,
- wherein at least one axially oriented projection is provided on the external face of the second plug connector,
- wherein the projection can be pushed into at least one co-operating axially oriented groove with an end face opening at the insertion end of the first plug connector if the release device is activated when the second plug connector is being inserted in the first plug connector, and wherein the at least one projection is prevented from being pushed into the at least one groove if the release device is deactivated.

11. The plug connection according to claim 10, wherein the release device is disposed on the external face of the first plug connector and comprises a ring rotatable along the external circumference of the first plug connector,
- wherein the ring has a first groove portion which is oriented in the radial direction in alignment with a second groove portion in the first plug connector when the release device is activated, and
- wherein the first groove portion is positioned at a distance from the second groove portion along the external circumferences of the first plug connector when the release device is deactivated by turning the ring.

12. A plug connection for connecting lines for pressurized liquids or gases, comprising:
- a first plug connector having an insertion end and a fixing end lying axially opposite,
- a second plug connector having an insertion end and a fixing end lying axially opposite, and the second plug connector can be inserted by its insertion end in the first plug connector via its insertion end,
- a detent spring fastened to the first plug connector which, in a closed position on the first plug connector and when the second plug connector is inserted, engages in a radially extending groove in an external face of the second plug connector via at least one retaining portion so that the second plug connector inserted in the first plug connector is prevented from becoming loose, and
- a radially extending bevel ramp for the at least one retaining portion of the detent spring between the insertion end and the groove of the second plug connector,
- wherein the detent spring in the closed position on the first plug connector is configured to be moved from a locked position into an unlocked position,
- wherein in the locked position the at least one retaining portion is blocked relative to the first plug connector to prevent a movement radially outwards,
- wherein in the unlocked position, movement of the at least one retaining portion radially outwards is unblocked,
- wherein a release device which can be selectively activated is disposed on the first plug connector,
- wherein the release device when deactivated enables the detent spring to be positioned in the locked position and the release device when activated is configured to hold the detent spring in the unlocked position,
- wherein a retaining lug of the release device engages in a first retaining groove when the release device is deactivated and in a second retaining groove when the release device is activated, and
- wherein the retaining lug can be moved out of the respective retaining groove and can be moved together with the release device to the other respective retaining groove.

* * * * *